United States Patent

Minnie

[15] 3,647,346
[45] Mar. 7, 1972

[54] EXTRUSION DIE WITH ADJUSTABLE DAMS

[72] Inventor: Armand F. Minnie, Ludlow, Mass.

[73] Assignee: Monsanto Company, St. Louis, Mo.

[22] Filed: Apr. 27, 1970

[21] Appl. No.: 32,199

[52] U.S. Cl. .......................... 425/466, 264/176 R, 18/15 R
[51] Int. Cl. ............................................................. B29f 3/04
[58] Field of Search ................ 18/12 DS, 12 DM, 13 D, 13 P, 18/14 V, 15 R, 15 F, 12 F; 264/176 R, 177 R

[56] References Cited

UNITED STATES PATENTS

| | | | |
|---|---|---|---|
| 3,320,634 | 5/1967 | Ryan et al. | 18/12 DS |
| 3,217,358 | 11/1965 | Kihara | 18/12 DS |
| 2,365,482 | 12/1944 | Manken et al. | 18/12 DM |
| 3,112,527 | 12/1963 | Pankratz et al. | 18/12 DS |
| 3,178,770 | 4/1965 | Willis | 18/13 D X |
| 3,464,087 | 9/1969 | Koch | 18/12 DS |

FOREIGN PATENTS OR APPLICATIONS

| | | | |
|---|---|---|---|
| 245,792 | 3/1966 | Austria | 18/12 DM |

OTHER PUBLICATIONS

International Plastics Engineering, page 453 Effects of Recent Fundamental Investigations–Schenkel

*Primary Examiner*—J. Spencer Overholser
*Assistant Examiner*—Michael O. Sutton
*Attorney*—William J. Farrington, James C. Logomasini, Richard W. Sternberg and Neal E. Willis

[57] ABSTRACT

An extrusion die with an adjustable dam for continuously controlling the width of extruded sheet material while eliminating dead space areas in the die flow channel in which the extruded material may be held up and thermally degraded. The die body has a streamlined feed channel which opens into a horizontally oriented, elongated, distribution channel having (a) a gradually outwardly tapering transition section which opens into (b) a horizontal uniform section located adjacent to the lateral end of the transition section. The distribution channel, including the transition section and the uniform section, opens into a coextensive, narrow, horizontally oriented, outlet channel having an orifice. An adjustable dam is adapted to sealingly engage and move within the uniform section and the adjoining portion of the outlet channel to control the width of the extruded sheet material by controlling the width of the distribution channel, the outlet channel, and the orifice. Because of the streamlined configuration of the distribution channel, the outlet channel, and the cooperating dam, the extruded material flows freely through the die with no material dead spots regardless of the position of the dam within the uniform section. The die can operate effectively with one dam and one uniform section. However the use of two dams and two uniform sections located at the opposite lateral ends of the transition section provides greater flexibility in controlling the width of the extruded sheet.

10 Claims, 3 Drawing Figures

EXTRUSION DIE WITH ADJUSTABLE DAMS

BACKGROUND OF THE INVENTION

1. Field of the Invention

This invention relates to an extrusion die with adjustable dams for controlling the width of extruded sheet material, and more specifically, to an adjustable die orifice and channel having no dead spots to cause the hold up and thermal degradation of the material being extruded.

2. Description of the Prior Art

It is known to the extrusion art that the size of a die can be controlled by means of moving the sidewalls defining the opening. However, the dies currently available which provide a means for controlling the orifice opening do not maintain completely streamlined channel configurations when the size of the orifice is changed. Consequently, material builds up at dead spots located at various positions within the channels of these conventional extrusion dies. This feature becomes particularly important when the material being extruded is molten thermoplastic which is subject to thermal degradation because degraded thermoplastic inclusions will destroy the quality and usefulness of the sheet. In a conventional die, an adjustment of the dam positions to increase the width of the sheet will usually permit degraded thermoplastic particles located in dead spots behind the dams to flow out the orifice and form inclusions which make the sheet unsuitable for use. Furthermore, the conventional dies used do not provide the flexibility required for positioning the extruded sheet material and altering the width of the sheet material while it is being continuously passed onto a die roll or other takeoff means. Dies having dead spots within their channels periodically require a process shutdown in order to remove the material being held-up in these dead spots. Such a disruption of the process continuity produces inefficiency and frequently an extruded sheet of inferior quality.

SUMMARY OF THE INVENTION

Now there has been developed a new combination extrusion die with adjustable dams, hereto unknown to the prior art, which resolves the problems described above. In particular, the die has been designed to include a completely streamlined flow channel regardless of the changes in the width of the extruded sheet. The die is designed to eliminate any dead spots by having a unique channel and dam configuration.

Accordingly, the main object of the present invention is to provide an improved extrusion die having one or more adjustable dams for controlling the width of extruded synthetic resin sheet.

An additional object of the present invention is to provide an extrusion die having a streamlined flow channel including an adjustable distribution channel, outlet channel and orifice wherein the flow channel has no dead spots in which material can be held-up and thermally degrade.

A further object of the present invention is to provide an extrusion die with two opposing, adjustable dams which can be controlled independently to alter the width of extruded synthetic resin sheet.

A still further object of the present invention is to provide an extrusion die with adjustable dams for controlling the position at which extruded synthetic sheet passes onto a cooperating die roll or other conveying system.

Other objects and advantages of the present invention will in part be obvious and will in part appear hereinafter.

These and other objects are attained by providing an extrusion die with an adjustable dam for controlling the width of extruded sheet material. The extrusion die comprises in combination:

a. a die body;

b. a streamlined feed channel within the die body; which opens into c. a substantially horizontally oriented, elongated, distribution channel which comprises (i) a gradually outwardly tapering transition section which opens into (ii) a substantially horizontally oriented uniform section, the uniform section being located adjacent to and downstream from the lateral end of the transition section, the uniform section having a smaller cross-sectional area than the transition section when the cross-sectional areas are measured in planes perpendicular to the longitudinal axis of the uniform section; the distribution channel opening into d. a narrow, substantially horizontally oriented outlet channel, the outlet channel being substantially coextensive with the distribution channel, the outlet channel having a substantially horizontally oriented orifice, the orifice being adapted to permit passage of the sheet material out of the die;

e. at least one adjustable dam having a cross-sectional configuration adapted to sealingly engage the outer peripheral openings of the uniform section and the adjacent portion of the outlet channel such that the distribution channel and the outlet channel have a streamlined configuration regardless of the extent to which the dam lies within the uniform section and the adjacent portion of the outlet channel; and f. means for moving the dam within the uniform section and the adjacent portion of the outlet channel to thereby control the width of the extruded sheet material.

BRIEF DESCRIPTION OF THE DRAWINGS

In describing the overall invention, reference will be made to the accompanying drawings in which.

DESCRIPTION OF THE ILLUSTRATED EMBODIMENTS

Figure 1:
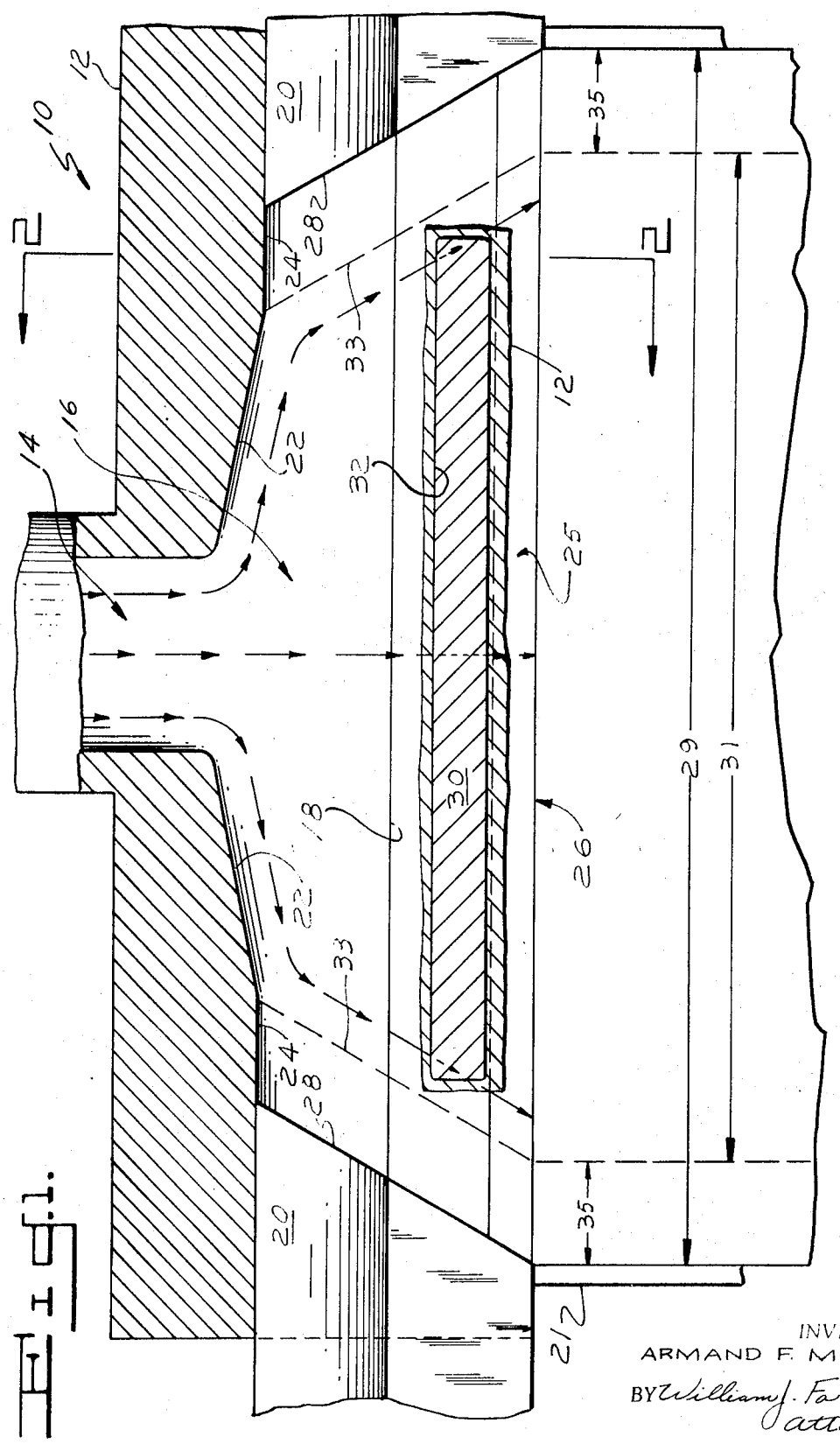
FIG. 1 is a plan view of a preferred embodiment of an extrusion die with two adjustable dams for controlling the width of extruded sheet material.

With reference to the drawings, there is shown in FIG. 1 an extrusion die 10 including a die body 12, a feed channel 14, a distribution channel 16, an outlet channel 18, two adjustable dams 20, and die roll 21.

The die body 12 has a generally rectangular configuration and houses the feed channel 14, the distribution channel 16, the outlet channel 18, the dams 20, and the choke member 30 (optional).

The streamlined feed channel 14 is preferably located in the center of the die body for uniform flow and pressure within the distribution channel. The feed channel 14 preferably has a streamlined configuration to facilitate flow of the molten resin through the die. A cylindrical feed channel 14 is preferred for ease of machining, and also because of the desirable flow characteristics of this configuration. However, other suitable streamlined configurations will become apparent to those skilled in the art upon reading this specification.

The feed channel 14 opens into a horizontally oriented, elongated, distribution channel 16. The central portion of the distribution channel 16 immediately adjacent to the feed channel 14 has a gradually outwardly tapering transition section 22 with the cross-sectional area of the transition section 22 being largest near the feed channel 14. The configuration of the transition section 22 is designed to produce streamlined flow characteristics. The two outer lateral ends of the tapering transition section 22 open downstream into two horizontally oriented, coaxial, uniform sections 24 having smaller cross-sectional areas than the transition section 22 when the cross-sectional areas are measured in planes perpendicular to the longitudinal axis of the uniform sections 24.

The outer uniform sections 24 and central tapering section 22 of the distribution channel 16 open into a narrow, elongated, horizontally oriented outlet channel 18 extending the entire length of the distribution channel 16. The outlet channel 18 terminates on the downstream side in a horizontally oriented orifice 26 which extends the entire length of the outlet channel 18. The orifice 26 is adapted to permit passage of the extruded sheet material out of the die 12. A restricted section 25 in the outlet channel 18 may optionally be utilized immediately adjacent to the upstream side of the orifice 26 in order to produce certain pressure and flow characteristics.

An adjustable dam 20 lies within each of the two uniform sections 24 of the distribution channel 16 and the adjoining portion of the outlet channel 18. Each adjustable dam 20 has a cross-sectional configuration adapted to sealingly engage the outer opening of its corresponding uniform section 24 and the adjoining portion of the outlet channel 18, and thus serves to block the passage of extruded material out of these peripheral openings. The adjustable dams 20 can move within the uniform sections 24 and outlet channel 18 to control the width of the sheet passing out the orifice 26. Each dam 20 has a face 28 which is exposed to the interior of the distribution channel 16 and the adjoining interior portion of the outlet channel 18. The face 28 is preferably tapered such that the downstream portion of the face 28 flares outwardly from the center of the distribution channel 16. This tapered configuration of the face 28 produces a more streamlined flow path for the extruded material and eliminates dead spots near the dams 20 regardless of the position of each of the dams 20 within its respective uniform section 24.

A means for reciprocally moving each dam 20 within its respective uniform section 24 and the adjoining portion of the outlet channel 18 is provided, such as mechanical means, automated hydraulic or air cylinder means, etc. The two dams 20 can be moved simultaneously by a single automatic or manual means to predetermined positions. Alternately, separate automatic or manual means can be provided to move each dam 20 independently. The separate movement of each dam 20 allows a great deal of flexibility in controlling the width of the sheet material and the position at which the sheet passes out of the orifice 26 onto the die roll 21 or other sheet removal means. The adjustable dams 20 are shown in the maximum sheet width 29 position in FIG. 1. The dotted lines 33 show the dams 20 extending further into the uniform sections 24 to produce a minimum sheet width 31. The amount of possible change in the sheet width is equal to the sum of the partial lengths 35 of the two uniform sections 24 within which the dams 20 may effectively move without entering the transition section 22.

Figure 2:
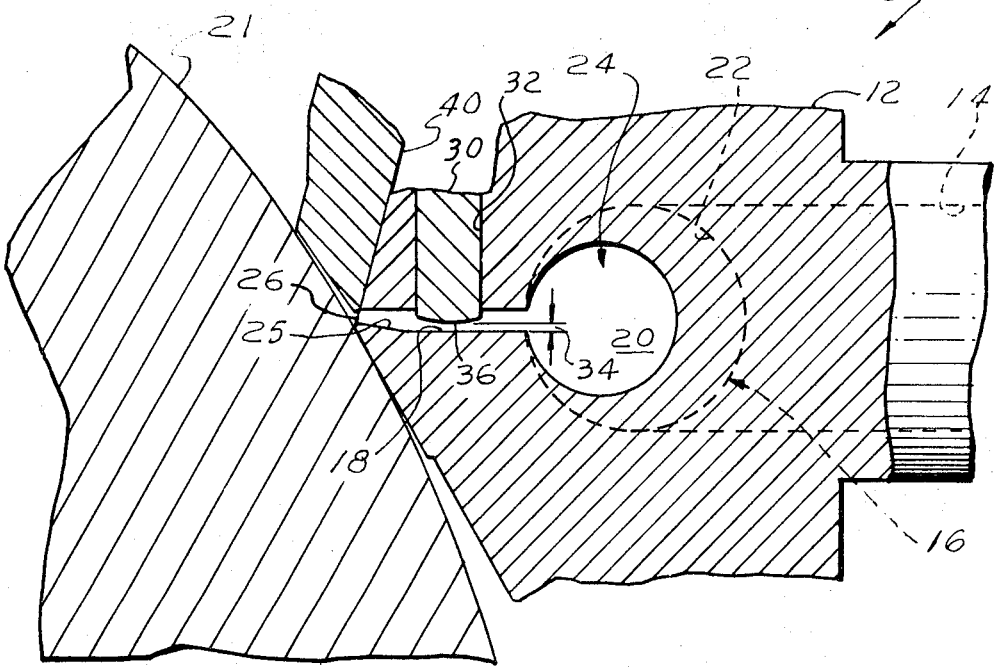
FIG. 2 is a side view section of FIG. 1 taken along the line 2—2.

FIG. 2 illustrates a cross-sectional side view taken along the line 2—2 of the die 10 of FIG. 1, including an adjustable, elongated, horizontally oriented choke member 30 which is shown in FIG. 1 by section lines in the outlet channel 18. The choke member 30 is adapted to pass vertically through a horizontal slot 32 in the upper wall defining the narrow outlet channel 18. The horizontal length of slot 32 is slightly narrower than the minimum lateral distance between the dams 20 measured across the choke member 30 in the outlet channel 18. The choke member 30 is adapted to move vertically through the slot 32 to adjust the height of the opening 34 in the outlet channel 18. By changing the size of the opening 34 the back pressure of the molten extrusion material within the distribution channel 16 can be controlled to achieve desired flow characteristics for the extruded sheet and also to regulate the rate of extrusion. The bottom end 36 of the choke member 30 has a streamlined configuration to eliminate dead spots when a substantial portion of the choke member 30 is lying within the outlet channel 18. By adjusting the position of the choke member 30 the pressure and velocity of the molten material within channels 14, 16, and 18 can be precisely controlled.

FIG. 2 also illustrates an apparatus for controlling the thickness of the extruded sheet material. Extruded sheet material passes through orifice 26 and adheres to the surface of a conveyor or takeoff system such as the roll 21 so as to be continuously removed from the orifice 26. A die blade 40 is adapted to move near the surface of the roll 21 at a position immediately downstream from the die orifice 26. The height of the die blade 40 above the roll 21 surface can be adjusted to control the thickness of the extruded sheet material.

Figure 3:
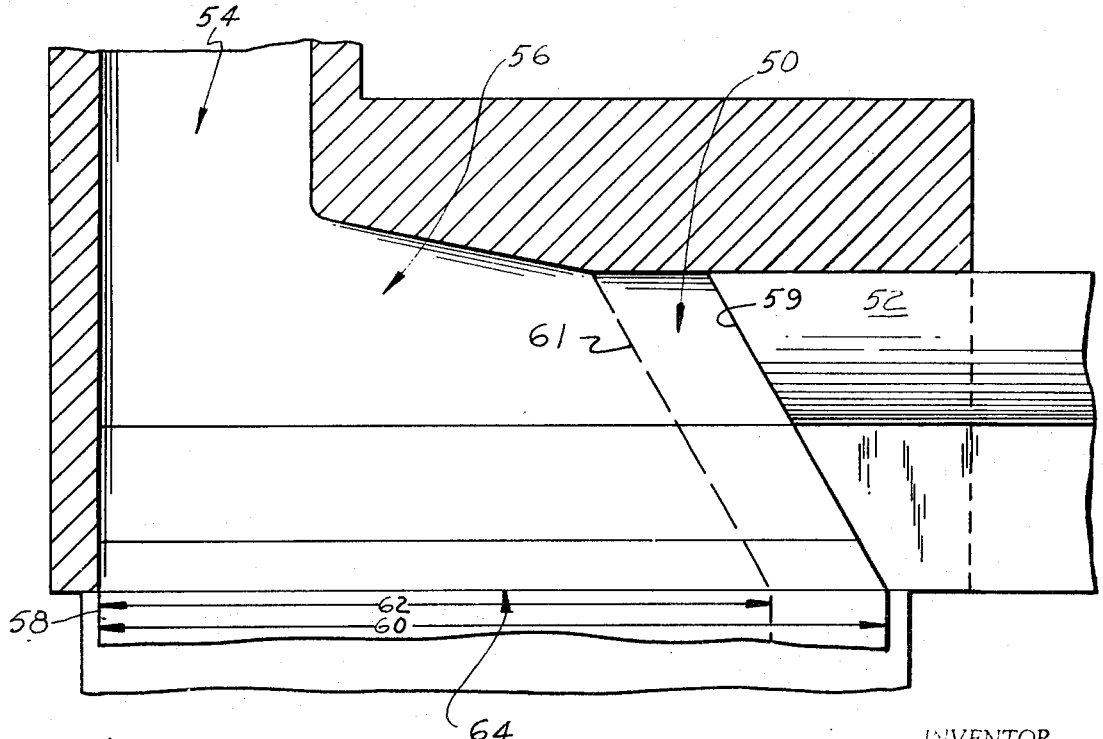
FIG. 3 illustrates an alternate embodiment of the invention.

The adjustable dam-streamlined channel concept described above is equally applicable to a distribution channel having a single uniform section 50 and a single cooperating dam 52 as illustrated in FIG. 3. The feed channel 54 opens into one end of the transition section 56 and may be oriented at any angle with respect to the transition section 56. Since there is only one adjustable dam 52, one edge 58 of the sheet material will remain in the same position despite changes in the sheet width due to movement of the dam 52. The solid line 59 shows the dam in the maximum sheet width 60 position, while the broken line 61 illustrates the position of the dam 52 for minimum sheet width 62. The uniform section 50 and transition section 56 are oriented such that they have an adjoining coextensive outlet channel 64.

In general, the preferred materials used in the construction of the extrusion die are soft and hardened steels. Low carbon steel is especially suitable for a die body having various contoured channels. The dams are preferably machined from a heat treated, wear resistant material. The portion of the distribution channel having the uniform cross section, and the adjacent portion of the outlet channel in which the dams move can be made from a high carbon, hardened steel.

The present invention finds utility in any continuously operating extrusion system in which the width of the sheet material is varied periodically. The unique configuration of the streamlined distribution channel and the cooperating dams eliminates all dead spots which may cause material holdup within the die flow channels, regardless of the position of the dams which control the width of the sheet being extruded. Furthermore, the flexibility provided by having the dams operate independently or together and being adjustable to predetermined positions increases the efficiency of operation during changes in sheet dimensions and also facilitates changes in the orientation of the extruded sheet on the die roll or other takeoff means. The invention is designed for a continuously operating extrusion system in which no shutdown of the equipment is required during such changes. The adjustable dam concept may also be used in cooperation with conventional sheet-forming dies not employing die rolls, such as gravity or conveyor belt extruded sheet removal systems. The invention is useful in any thermoplastic sheet extrusion system wherein adjustments to the sheet width must be made during continuous operation and thermally degraded inclusions would render the sheet product unsatisfactory.

Although the invention has been described with a certain degree of particularlity, it is understood that the present disclosure has been made only by way of example, and that many variations and modifications of the details of construction and arrangement of parts herein described will be obvious to those skilled in the art and may be carried out without departing from the spirit and scope of the invention as hereinafter claimed.

I claim:

1. An extrusion die with at least one adjustable dam for controlling the width of extruded sheet material, said extrusion die comprising in combination:
   a. a die body;
   b. a streamlined feed channel within said body; which opens into
   c. a substantially horizontally oriented, elongated, distribution channel comprising:
      1. a gradually outwardly tapering transition section; which opens into
      2. a uniform section located adjacent to and downstream from the lateral end of said transition section, said uniform section having a smaller cross-sectional area than said transition section, said cross-sectional areas being measured in planes perpendicular to the longitudinal axis of said uniform section; said distribution channel opening into
   d. a narrow substantially horizontally oriented outlet channel, said outlet channel being substantially coextensive with said distribution channel, said outlet channel having a substantially horizontally oriented orifice, said orifice being adapted to permit passage of said sheet material out of said die;

e. at least one adjustable dam having a cross-sectional configuration adapted to sealingly engage the outer peripheral openings of said uniform section of the distribution channel and the adjacent portion of said outlet channel, wherein said dam has an inner face exposed to the interior of said distribution channel and said outlet channel, said face being tapered such that the downstream portion of said face closest to said orifice flares outwardly from said transition section, such that said uniform section of the distribution channel and said outlet channel have a streamlined configuration regardless of the extent to which said dam lies within said uniform section and the adjacent portion of said outlet channel; and f. means for moving said dam within said uniform section and the adjacent portion of said outlet channel to control the width of the extruded sheet material.

2. The apparatus of claim 1 wherein said distribution channel is oriented at an angle substantially perpendicular to said feed channel.

3. The apparatus of claim 1 wherein feed channel is substantially cylindrical in configuration.

4. The apparatus of claim 1 wherein the portion of said outlet channel immediately adjacent to said orifice has a gradually tapered terminal end such that the vertical opening in said outlet channel is shorter at positions closer to said orifice.

5. An extrusion die with two adjustable dams for controlling the width of extruded sheet material, said extrusion die comprising in combination:

a. a die body;

b. a streamlined feed channel within said die body; which opens into c. a substantially horizontal streamlined distribution channel, comprising:

1. a central gradually tapering transition section flaring outwardly from said feed channel, said transition section opens into 2. two, coaxial, substantially horizontal, uniform sections, each uniform section being located adjacent to one of the two outer lateral ends of said transition section, each of said uniform sections having a smaller cross-sectional area than said transition section, said cross-sectional areas being measured in planes perpendicular to the longitudinal axis of said uniform sections; said distribution channel opening into d. a narrow, substantially horizontal, outlet channel, said outlet channel being substantially coextensive with said distribution channel, said outlet channel having a substantially horizontal orifice, said orifice being adapted to permit passage of said extruded sheet material out of said die;

e. two opposing adjustable dams, each dam having a cross-sectional configuration adapted to sealingly engage one of said two uniform sections and the adjacent portion of said outlet channel, each dam being adapted to move within its respective uniform section and the adjacent portion of said outlet channel, each of said dams having a face exposed to the interior of said distribution channel, each of said faces, said distribution channel, and said outlet channel having outwardly tapering configurations adapted for streamlined flow through said die channels regardless of the extent to which said dams lie within said uniform sections, and the adjacent portions of said outlet channel; and f. means for moving each of said opposing dams within their respective uniform sections and the adjacent portions of said outlet channel.

6. The apparatus of claim 5 including means for independently moving each of said two dams within their respective uniform sections and the adjacent portions of said outlet channel.

7. The apparatus of claim 5 including means for simultaneously moving each dam to a predetermined position.

8. The apparatus of claim 5 wherein said distribution channel is oriented at an angle substantially perpendicular to said feed channel.

9. The apparatus of claim 5 wherein said feed channel is substantially cylindrical in configuration.

10. The apparatus of claim 5 wherein the portion of said outlet channel immediately adjacent to said orifice has a gradually tapered terminal end such that the vertical opening in said outlet channel becomes shorter at positions closer to said orifice.

* * * * *